United States Patent

Germer, Jr. et al.

[15] 3,700,031
[45] Oct. 24, 1972

[54] SECONDARY RECOVERY AND WELL STIMULATION, SOLUTIONS, AND METHODS OF USE

[72] Inventors: Walter F. Germer, Jr., Edna; Carl W. Stringer; William H. Harrison, both of Houston, all of Tex.

[73] Assignee: Germer-Stringer Corporation, Houston, Tex.

[22] Filed: June 18, 1970

[21] Appl. No.: 47,311

[52] U.S. Cl. ..............166/270, 166/273, 166/274, 166/305 D, 166/305 R
[51] Int. Cl. ...............................E21b 43/22
[58] Field of Search......166/268, 269, 270, 273-275, 166/305; 252/8.55 D

[56] References Cited

UNITED STATES PATENTS

| 3,288,213 | 11/1966 | King et al. .................166/274 |
| 3,369,602 | 2/1968 | Fallgatter et al...........166/273 |
| 3,376,925 | 4/1968 | Coppel......................166/274 |
| 3,384,171 | 5/1968 | Parker.......................166/274 |
| 3,414,054 | 12/1968 | Bernard......................166/273 |
| 3,437,141 | 4/1969 | Brandner et al............166/273 |
| 3,468,377 | 9/1969 | Dunlap et al...............166/274 |
| 3,469,630 | 9/1969 | Hurd et al..............166/273 X |
| 3,493,051 | 2/1970 | Gogarty.....................166/273 |
| 3,497,007 | 2/1970 | Williams et al............166/273 |
| 3,537,520 | 11/1970 | Holm.........................166/273 |

Primary Examiner—Stephen J. Novosad
Attorney—Robert W. B. Dickerson

[57] ABSTRACT

The disclosure is to secondary recovery and well stimulation, solutions, and methods of use. Primarily combinations of sacrificial material capable of plating on formation surfaces and extending detergent action, are used together with at least one of a detergent, an emulsifier, and caustic as an emulsification activator, such use being conjointly with, or after the sacrificial material.

62 Claims, 9 Drawing Figures

WALTER F. GERMER, JR.
CARL W. STRINGER
WILLIAM M. HARRISON
INVENTORS

BY Wm. E. Ford
ATTORNEY

WALTER F. GERMER, JR.
CARL W. STRINGER
WILLIAM M. HARRISON
INVENTORS

BY Wm. E. Ford
ATTORNEY

SECONDARY RECOVERY AND WELL STIMULATION, SOLUTIONS, AND METHODS OF USE

For a long number of years large volumes of oil have been abandoned down in the earth when wells drilled thereto have ceased producing for various reasons; it being a geological estimate that from 20 percent to 95 percent of oil originally in place is left behind. There are many processes for secondary recovery of oils, as "-fire" flooding, water flooding, steam flooding, miscible flooding, carbon dioxide or "pop bottle" flooding, and the like, all having serious drawbacks.

Additionally, the circulating fluid or drilling mud circulated down the drill stem and up the annulus therearound in the rotary method of drilling wells, as oil and gas wells, could be improved by the introduction thereinto of an additive of some viscosity, and lubricating action, advantageous to circulate the drilling mud at least in part in state of invert emulsion.

Another specific use arises in the disposition of water produced with oil, as from a multiplicity of wells, where it may be required that the water thus produced is pumped back into a common disposal well designated for this purpose. In such case a special flow stimulating solution is needed and can well serve as an agent introduced into the disposal well to bring into emulsion any oil introduced into the disposal well.

The solution may thus serve to bring into a state of emulsion and cut away any film or other matter previously carried into the disposal well with the disposed water, to clog or otherwise settle an oil film on the formation surrounding the waters of disposal, thus to limit the expansion of the disposal area, as more disposal water may demand; in such cases the generally intended bounds of the disposal area may be said to be circumscribed or "packed in," whereby the solution of this invention may break the dam or circumscription of this predetermined area by bringing the film or other damning material into emulsion to open up paths and areas through which the volume of the disposal area may be expanded.

By proper selection of detergents, unstable emulsions of petroleum hydrocarbons can be formed which will break upon standing, thus eliminating the necessity of using emulsion breakers. The characteristics of unstable emulsions thus obtained can be utilized in the recovery of oil by water flood with chemical.

Accordingly it is a primary object of the invention to use sacrificial material together with a detergent as emulsifier, or with an emulsification activator such as caustic, these being either with, or after the sacrificial material for secondary recovery or well stimulation.

It is also another object of the invention to use the sacrificial material with detergent, as emulsifier together with caustic as emulsification activator.

It is an additional object of the invention to use an aforesaid emulsification activator, wherein the term caustic connotates an alkali metal or ammonium in hydroxide, oxide, borate, silicate or phosphate combination.

It is also an additional object of the invention to use combinations, as aforesaid, in which the term caustic comprises organic amines and ethanolamines, their polymers and their salts, and their esters.

It is also a further object of the invention to employ a sacrificial material which may be comprised of multiple numbers of functional groups competitive with the functional groups of the detergent for anchor sites on the formation; or which may alter these anchor sites so that the detergent functional groups are incapable of attaching thereto.

It is a further object of the invention to provide a flow stimulating solution of this class, and method of its use, whereby it is adapted to be introduced into a water disposal well, as for a multiplicity of wells which have produced water with the oil, the solution bringing deposits upon the disposal well formation into emulsion, thereby unclogging the formation to permit enlargement of the water disposal area.

It is yet another object of the invention to provide a flow stimulating solution and methods of its use, in which employment of the solution is suggested in a vast number of operations in extension of, or replacement of "acidizing" or "fracturing" operations, with flow stimulation being attained by removal of paraffin or heavy oil to increase the permeability around the bore thus to expand the drainage of the well.

It is yet another object of the invention to provide for use combinations of the class hereinabove described in which the sacrificial material may comprise anionic, cationic, non-ionic or caustic materials, separately or in various combinations.

It is also a further object of the invention to provide for use combinations of the class hereinabove described which include spontaneous emulsifiers capable of loading up the emulsion with a minimum of movement.

It is still another object of the invention to provide for use combinations of the class described including stable or unstable emulsions, the unstable emulsions first emulsifying and then de-emulsifying the oil to form oil banks, thus to limit "fingering."

It is a further and additional object of the invention to provide for use combinations of this class described including spontaneous emulsifiers, which enable the flooding of the formation in manner that the flooding may be left to slow down or stop whereby the oil may migrate to form an oil bank, thus allowing maximum oil recovery with a minimum amount of chemicals being expended, and with a minimum of mechanical assistance.

It is yet a further object of the invention to provide for use combinations of the class described in which the caustic activates the surface active materials in the oil, (natural or introduced); the concentration of the caustic varying the particle size, the higher the concentration of caustic, the smaller the particle size within the limits of the oil mixture.

It is also an additional object of the invention to provide for use combinations of the class described which include detergents employed to alter surface tension of (a) water, or (b) the oil, or (c) both water and oil, to form emulsion when coupled with sacrificial material.

It is also another object of the invention to provide for use combinations of the class described which include caustics employed to alter surface tension of the oil to form emulsion when coupled with sacrificial material.

It is still a further object of the invention to provide for use combinations of the class described which include both detergents and caustics to alter surface tension of (a) water or (b) oil or (c) both oil and water, to form an emulsion when coupled with sacrificial material.

It is also still a further object of the invention to provide for use combinations of the class described which include a water solution and an oil soluble detergent together to alter the hydrophilic-lyophilic balance of the oil-water system to form an emulsion when coupled with a sacrificial material.

Also, the invention has, as an important object, the chemical treatment by water flood of reservoirs containing two or more permeabilities, comprising chemical sweep, followed by introducing into the most permeable sand, a salt of a multi-valent material capable of forming an invert emulsion, thus sealing off the flooded zones.

Additionally the invention has, as a further object, the formation of an invert emulsion, as hereinabove described, thus to seal off the permeable sand and prevent "coning" or migration of water.

Also, a further object of the invention is to provide for use, combinations of the class described, including materials which react with multi-valent, metallic ions in manner to tie up the metallic ions into form incapable of reacting to form invert emulsions.

It is also a further object of the invention to provide for use combinations of the class described in which, in oil wetted sands, penetrating agents may be employed to pry the oil off the sand to give sheeting action, some penetrating agents comprising sugars, and their polymers, amines and ethanolamines, their polymers, their salts, and their esters, silicones coupled with caustics, salts, borax, phosphates and silicates.

It is also another object of the invention to provide for use combinations of the class described whereby the addition of borax into the concentration in ratio of 50 parts per million, or higher, will inhibit the swellings of clays.

It is also another object of the invention to provide for use combinations of the class described including solubilizing agents to aid in emulsification, emulsified crudes being used to emulsify other crudes.

It is yet a further object of the invention to provide for use combinations of the class described including viscosified displacing fluids to aid in more uniform recovery of oil.

It is also a further object of the invention to provide for use combinations of the class described in which chemical water flood may be followed up with fresh or salt waters thus to save costs of chemicals; this savings to be coupled with the savings from the use of spontaneous emulsifiers.

It is still another and additional object of the invention to provide for the use of limited amounts of sacrificial materials in manner that they will be used up and the detergent will then plate out on the formation at a desired period. This prevents detergent from migrating across lease boundaries or into drinking water.

It is also an additional object of the invention to provide for the use of emulsifying materials to aid in the lifting of heavy crude oils from the formation to the well head.

It is also an additional and further object of the invention to provide a method of employing an emulsifier to form an unstable emulsion which breaks to form an oil bank, followed by a stable emulsifier to give optimum emulsification with a minimum chemical, fresh, salt or viscous water then be applied and followed by fresh or salt water.

It is an additional and special object of the invention, based on the method set forth immediately hereinabove to incorporate, as needed, sacrificial materials, spontaneous emulsifiers, penetrants, solvating agents, and wetting agents.

Other and further objects will be apparent when the specification hereinbelow is considered in connection with the drawings, in which.

Figure 1:
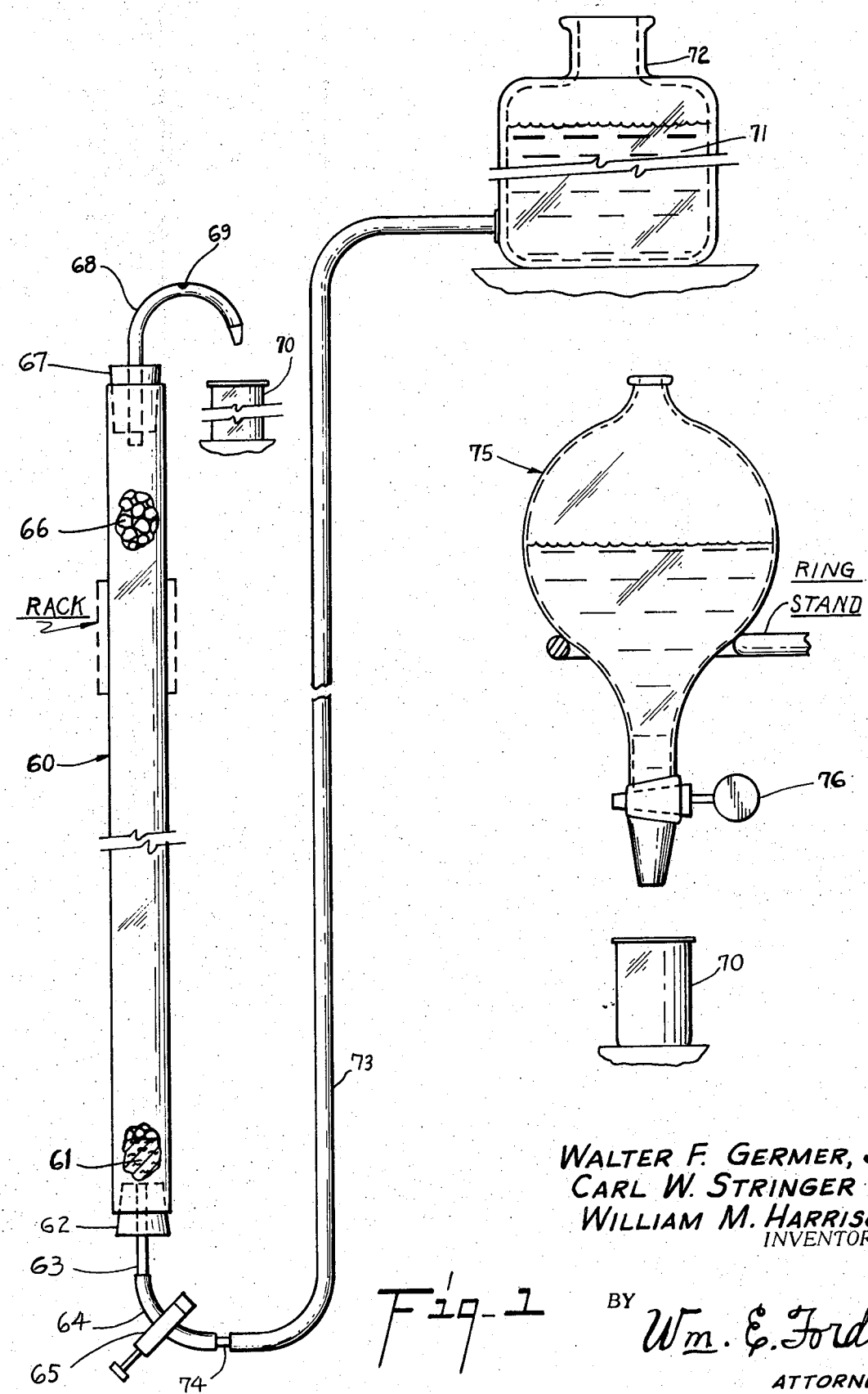
FIG. 1 is an elevational view, partially diagrammatic, showing laboratory apparatus employed in testing applicability of ingredients of the invention.

The apparatus hereinabove described forms a background for the employment of the solution of this invention in manner that the oil bearing emulsion with substantial fluidity, may be discharged to the settling tank, with the settling agent already introduced thereinto so that the emulsion is breaking up and on its way to settling as soon as it enters the settling tank.

Referring back now to the statement of objects, tests were made in support of the successive objects, with results as follows:

First, a dilute solution of sodium bentonite or sodium montmorillinite was placed on a microscope slide and its Brownian motion observed, thus imparting the information that the material was in a deflocculated stage, or in suspension. A drop of aqueous solution containing either an anionic detergent, such as an alkylaryl sulfonate, or a cationic detergent, such as a short chain amine, was added to the droplet containing the bentonite, and this caused flocculation or coagulation of the sodium bentonite, thereby demonstrating that either anionic or cationic detergents would adhere to, or be absorbed into clay (bentonite) particles.

Also a sudsing non-ionic solution, 0.1 percent, as Triton X100, (a nonyl-phenol) containing 7½ moles of ethylene oxide may have 1 gram of sodium bentonite added thereto. Then when shaken no suds will occur. This establishes that clays absorb the non-ionic detergents.

Now, a similar dilute solution of sodium bentonite or sodium montmorillonite sample was taken and had added thereto sacrificial material such as borax, or sodium borate (for the amines), or a lignosulfonate (for the alkylarylsulfonate). Now, respectively, to the sample containing borax, a short chain amine was added, and to the sample containing ligno-sulfonate, the alkylarylsulfonate was added. In neither case did the bentonite flocculate.

When a dilute solution of bentonite is added, respectively, by either (1) an amine solution containing borax, or (2) an alkylarylsulfonate solution containing lignosulfonates, the bentonite remains deflocculated.

When a bentonite solution is flocculated, respectively, by either (1) an amine, or (2) an alkylarylsulfonate, treatment with either borate or lignosulfonate has no immediate effect on flocculated bentonite. This proves that the sacrificial materials act to prevent the plating out of the anionic or cationic detergent on the clay due to the action of the sacrificial material.

When Triton X100 (0.1 percent) containing 1 gram of sugar per c.c. is added to 1 gram of sodium bentonite and the solution is shaken, sudsing occurs. This proves that with a sacrificial polymer (sugar) present, the non-ionic detergent is available to form suds.

The use of sacrificial material with detergent as an emulsifier and with caustic as an emulsification activator is further demonstrated by the following experiment:

A plurality of glass tubes 1 inch in diameter and 4 feet in length were rack mounted. Each tube 60 being in correspondence with a tube 60 shown in FIG. 5. The bottom of the tube 60 has a glass wool plug 61 inserted upwardly into its lower end, and immediately therebelow a cork stopper 62 is inserted, a short ¼inch copper tubing 63 extending axially through the stopper 62, as shown. A short length of transparent plastic tubing 64, is fitted upon the lower end of the copper tubing 63, and a pinch clamp 65 is clamped upon the plastic tubing 64, normally to keep it pinched closed. Water is then poured into the glass tube 60 up to approximately one-third the height thereof. Any air trapped by the water is worked out by mechanical agitation.

Then gravel, 10–15 mesh, is dropped slowly into the tube 60, accompanied by mechanical tapping, thus to expel occluded air and aid in packing the gravel, the gravel being in amount to extend to approximately 8 inches from the top of the 48 inch tube, and the water level is kept above the gravel level at all times. Oil is now poured into the tube 60 at the top, the type of test oil employed in tests set forth below being Barbers Hill crude oil, (24 A. P. I. gravity).

The pinch clamp 65 is now opened to let the water drain from the tube 60. As the water drains out the bottom of the tube it "pulls" vacuum, sucking the oil downwardly into the interspaces between the water wet gravel. In the meantime, more oil is poured into the tube 60 to maintain the oil level aforesaid. When the oil reaches the glass wool plug 61, as visually indicated to the operator, the pinch clamp 65 is closed. Now water damped gravel of the aforesaid mesh range is added into the tube 60 to fill it to within approximately 1 inch from the top with gravel. Any excess oil, above the level of the gravel, is now removed so that the oil level and gravel level coincide. Thus the packed tube 60 now assimilates oil reservoir conditions down in the earth and the packed tube contents may hereinbelow be referred to as the reservoir 66.

Figure 5:
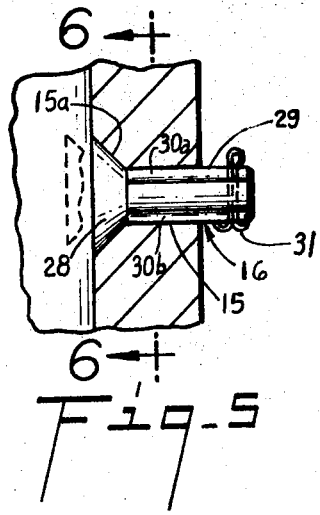
FIG. 5 is an enlarged, fragmentary sectional elevational view of an inwardly opening flapper valve of the type shown to smaller scale in FIG. 4.

A cork stopper 67 is inserted into the top of the tube 60, the stopper 67 having a copper tubing length 68 inserted axially therethrough. The copper tubing 68 has its outer end recurved, as shown in FIG. 5, a small weep hole 69 being provided therein at the highest point thereof, to insure against air blockage. A beaker 70 is placed under the tube 68 to receive produced fluids.

The test solution 71, included by the invention, is poured into an aspirator bottle 72 which is fitted with a long plastic tubing 73, approximately 6 feet long, with a short length of copper tubing 74 that serves as a connector between the plastic tubing 64 and the plastic tubing 73. All air is now removed from the system by pinching the tubing 73, all the way to the top thereof, to bubble out through the aspirator bottle 72. The aspirator bottle 72 is now raised to approximately 1 foot above the weep hole 69, the highest point in the upper copper tubing 68. Then pinch clamp 65 is opened to allow the test solution to flow downwardly through the plastic tubing 73 at a desired rate, to pass into the lower end of the reservoir 66, the test solution 71 shoving the reservoir oil upwardly through tubing 68 to drop into the beaker 70.

As test solution 71 is successively added below the oil, the level of oil-solution rises as unemulsified oil is pushed upwardly, and as other oil remains behind being emulsified by the solution. Thus oil passes upwardly through the tube 68 and into the beaker 70 until the oil-solution level first enters the tube 68 and finally reaches the terminal end of the curved tube 68. This occurrence is visually discernible as the first drop of solution falls from the end of the tube 68 into the beaker 70. When the first drop of solution 71 drops into beaker 70, it is known that primary production from the reservoir 66 is completed. Then the beaker 70 may be replaced by another beaker. This process of filling successive beakers at desired intervals is continued throughout a "run."

The beaker 70 containing the primary oil and solution drop(s) is weighed and transfer is made to a separatory (glass) funnel, with its stop cock 76 closed. Care is taken that all free solution 71 is transferred into the separatory funnel 75. The beaker 70 is then cleaned, dried, and weighed. Now the stop cock 76 is carefully opened and the operator watches the free solution drop therefrom into the dried, weighed beaker 70. The stop cock 76 is closed substantially instantaneously as the last of the solution 71 passes through the stop cock 76. Thus all of the solution 71 that first fell from the tube 69 into the beaker 70 is separated from the primary production. This is then weighed and the weight of the beaker 70 is subtracted to give the weight of solution 71 that occurred in the aforesaid primary production. Now, the weight of beaker 70 and solution 71 is subtracted from the total weight of beaker, oil and solution, to give the weight of the primary production (oil).

Successive beakers 70 are filled with the produced fluids which fall from the tube 68, with the contents following the initial production comprising either oil in emulsion in the solution, or successions of droplets of oil and droplets of solution. The droplets normally break upon standing in the beaker, and when the produced fluids fall into the beaker in emulsified state, the emulsion breaks in the beaker. If the emulsion turns out to be a "stable" emulsion, difficult to break, a weighed amount of water soluble emulsion breakers may be added, for example, sodium chloride.

The successive beakers 70 of separated droplets or of broken emulsion contents, have contents added successively and cumulatively into the separatory funnel 75, which should be of some substantial size, as for instance, 500 c.c. As hereinabove described, in each case, the solution 71 is carefully separated out through the stop cock 76, and carefully weighed. In case of emulsion breakers having been added, this weight is subtracted from the recorded separated solution weights. When the last beaker is separated into the separatory funnel, a wait of one-half hour or more being recommended to allow all solution to separate. A "run" is substantially finished when a desired or predetermined amount of fluid or solution 71 has been dropped from the aspirator or dropping bottle 72 to pass up through the reservoir or tube 60 into successive beakers 70.

In conclusion, the glass wool plug 61 and the stopper 62 are carefully removed and all solutions and sand or gravel are dropped from the tube 60 into a large beaker. The oil is extracted by means of a low boiling point solvent, such as benzene, toluene or carbon tetrachloride. The fluids thus resulting are all accumulated in another beaker. When the washings are clean or clear, these fluids (washings and solution) are placed in a separatory funnel and the aqueous solution is separated from the solvent, and the solvent containing the oil is removed from the oil by distillation. Assumption is that the oil is heavy and has no light fractions that distill within the distillation range of the solvent. The residual oil is now weighed and is added to the cumulative total of oil produced to give the total oil in the completed run. The final cumulative oil over the total oil gives the percentage of recovery.

In order to equate the total oil in all the runs, the run with the largest amount of total oil is set as the standard run, and for purposes of comparison, all fluid weights are substantially multiplied by a factor of the standard total oil weight over the total weight of the oil in the run to be corrected.

The results of nine "runs" by the above set forth technique will be tabulated hereinbelow, the oil being used being termed Barbers Hill crude oil, a well-known type from wells in Chambers County, Texas, with test data as follows:

|  | Completion Time |
|---|---|
| Run No. 1 with .1% Triton X 100,* .1% CQ** and .5% sugar | 1 day |
| Run No. 2 with .1% Triton X 100 only | 1 day |
| Run No. 3 with water flood only | 1 day |
| Run No. 4 with .1% Triton X 100 | 2 days<sup>a</sup> |
| Run No. 5 with .1% Triton X 100, .1% CQ, .1% NaOH, .5% sugar | 2 days<sup>b</sup> |
| Run No. 6 with .1% Triton X 100, .1% CQ, .1% NaOH, .5% sugar | 2 days<sup>c</sup> |
| Run No. 7 with water flood only | 2 days<sup>a</sup> |
| Run No. 8 with .1% Triton X 100 | 3 days<sup>d</sup> |
| Run No. 9 with .1% Triton X 100, .05% NaOH, .1% CQ, .5 sugar | 3 days<sup>e</sup> |

*Triton X 100 is nonyl phenol with 8.5 moles of ethylene oxide
**CQ is a causticized calcium lignosulfonate.
<sup>a</sup>First days run for primary production only. Second day gave second primary plus secondary production.
<sup>b</sup>As a) except after 140 ml. of solution had entered the reservoir, fresh water was substituted for the solution.
<sup>c</sup>As b) except after 200 ml. of solution had entered the reservoir, fresh water was substituted for the solution.
<sup>d</sup>First day, first primary was collected; second day, second primary was collected, third day run was completed.
<sup>e</sup>As d) except after 235 ml. of solution had entered the reservoir, fresh water was substituted for the solution.

| Cumulative Fluid | Cumulative Oil | Oil/Water Ratio |
|---|---|---|
| Run No. 1* | | |
| 48.0 | 47.1 | 52 |
| 102.0 | 63.0 | .45 |
| 176.0 | 96.0 | .89 |
| 240.0 | 103.0 | .107 |
| 304.0 | 109.0 | .118 |
| 355.0 | 115.0 | .178 |
| 404.0 | 124.0 | .165 |
| 464.0 | 134.0 | .147 |
| 510.0 | 139.0 | .159 |
| 546.0 | 146 | .146 |
| Oil in sand | 14.9 | |
| Total oil | 160.9 | 146/160.9=90.5% recovery |
| Run No. 2* | | |
| 51.5 | 47.5 | 8.4 |
| 246.0 | 69.0 | .125 |
| 306.0 | 74.0 | .098 |
| 360.0 | 75.0 | .0076 |
| 415.0 | 77.0 | .029 |
| 559.0 | 87.0 | .063 |
| Oil in sand | 72.3 | |
| Total oil | 159.3 | 87/159.3=53.3% recovery |
| Run No. 3* | | |
| 51.9 | 50 | 8.15 |
| 168 | 73.6 | .385 |
| 235.8 | 76.4 | .042 |
| 300 | 81.7 | .095 |
| 353 | 84.8 | .059 |
| 405 | 85.6 | .015 |
| 440 | 86.6 | .033 |
| 580 | 94.0 | .056 |
| Oil in sand | 63.3 | |
| Total oil | 157.3 | 94.0/157.3=59.7% recovery |
| Run No. 4* | | |
| 56.9 | 56.5 | 134 |
| 62.5 | 61.7 | 19 |
| 86.5 | 76.0 | 1.37 |
| 139 | 80.6 | .101 |
| 190 | 85.0 | .091 |
| 245 | 87.8 | .054 |
| 307 | 90.0 | .045 |
| 330 | 91.0 | .025 |
| Oil in sand | 68.5 | |
| Total oil | 159.5 | 91.0/159.5=57% recovery |
| Run No. 5* | | |
| 40.8 | 40.1 | 57.5 |
| 45.5 | 44.6 | 22.5 |
| 87.0 | 64.9 | .964 |
| 137.7 | 81.8 | .500 |
| 144.5 | 87.9 | 8.7 |
| 179.8 | 106.6 | 1.13 |
| 255.9 | 141.7 | .860 |
| 327.3 | 155.1 | .232 |
| 395.8 | 156.8 | .256 |
| Oil in sand | 2.5 | |
| Total oil | 159.3 | 156.8/159.3=98% recovery |
| Run No. 6* | | |
| 39.6 | 37.3 | 29.7 |
| 43.5 | 41.3 | 3.2 |
| 51.0 | 47.5 | 5.0 |
| 93.3 | 60.4 | 10.1 |
| 134.2 | 71.0 | 8.6 |
| 180.0 | 88.6 | 14.0 |

| | | |
|---|---|---|
| 243.0 | 120.0 | 25.1 |
| 316.0 | 152.0 | 25.9 |
| 357.0 | 154.0 | 0.7 |
| 375.0 | 154.5 | 0.7 |
| 421.0 | 155.0 | 0.7 |
| 470.0 | 156.0 | 0.6 |
| 495.0 | 156.5 | 0.1 |
| Oil in sand | 1.76 | |
| Total oil | 158.26 | 156.5/158.26=99% recovery |

Run No. 7*

| | | |
|---|---|---|
| 57.0 | 56.8 | 368 |
| 70.5 | 68.6 | 6.9 |
| 96.5 | 86.2 | 2.13 |
| 152.0 | 93.0 | .130 |
| 221.5 | 99.0 | .099 |
| 285.0 | 101.2 | .038 |
| 341.0 | 101.8 | .048 |
| 390.0 | 104.0 | .050 |
| 440.0 | 105.0 | .040 |
| 495.0 | 108.0 | .048 |
| 549.0 | 108.7 | .009 |
| 603.0 | 109.0 | .0086 |
| Oil in sand | 50.3 | |
| Total oil | 159.3 | 109.0/159.3=68.5% recovery |

Run No. 8*

| | | |
|---|---|---|
| 49.4 | 49.1 | 181 |
| 102 | 66.3 | .485 |
| 148.5 | 73.5 | .181 |
| 195 | 77.5 | .097 |
| 244 | 80.5 | .062 |
| 300 | 83.6 | .057 |
| 358.5 | 86.4 | .050 |
| 403 | 88.0 | .0386 |
| 590 | 95.9 | .0437 |
| Oil in sand | 63.4 | |
| Total oil | 159.3 | 95.9/159.3=60.3% recovery |

Run No. 9*

| | | |
|---|---|---|
| 37.8 | 37.6 | 177 |
| 74.6 | 50.0 | 151 |
| 103 | 56.5 | .28 |
| 146 | 67.0 | .352 |
| 191 | 77.8 | .260 |
| 229.5 | 93.0 | .768 |
| 266 | 112.5 | 1.23 |
| 350 | 153.0 | 1.07 |
| 431 | 157.0 | .052 |
| 465 | 157.4 | .016 |
| Oil in sand | 1.9 | |
| Total oil | 159.3 | 157.4/159.3=99% recovery |

*Runs 1–4 and 6–9 substantially corrected to Run No. 5 standard.

It was observed during the foregoing tests, Runs 1–9, that an ethoxylated nonyl phenol (Triton X100) will emulsify the oil only after all silica surfaces are pacified. Evidence that the solution stood about 3 feet in the reservoir column under the oil bank before emulsification in the bottom area in vicinity of the glass wool plug 61. It was also observed that the Triton X100 did not emulsify the oil if the pressure differential stood lower than 0.75 p.s.i., as determined by the relative height of aspirator bottle 72 over the top of the copper tubing 68 at its highest point 69.

The multiple hydroxyl groups of the sugar and its polymers, as dextrins and starches, are capable of hydrogen bonding to a multiplicity of anchor sites, thus discouraging the terminal hydroxyl groups of the nonionic detergents, Triton X100, from bonding. The addition of a causticized calcium lignosulfonate, (CQ), acts as a spontaneous emulsifier as coupled with Triton X100. (In course of observations of other tests, it was noted that sodium or ammonium lignosulfonate caused spontaneous emulsification without caustic being present). Other detergents will form unstable emulsions with recovery as high as noted in the tests, Runs 1–9, however Triton X100 was used in all of the foregoing tests because of its exemplary status, and to maintain the standard for detergency in each test. It will be noted from Runs 5, 6 and 9 that, where one-third of the amount of Triton X100 coupled with the listed chemicals was first used and followed by a pour volume of water, the yield resulted in two-thirds more oil recovery than when three pour volumes of Triton X100 were used. The differences between Run 1 and Runs 2 and 4 are due to sacrificial polymers (sugar, and the like) occurring in Run 1 and not in Runs 2 and 4. The effect of the addition of caustic (NaOH) in Runs 5, 6 and 9 is shown by the recorded results, as aforesaid.

To show the effect of organic bases (cationic detergents) the following tests were run with a Liberty (Liberty County, Texas) crude oil, A.P.I. gravity 36.
Run No. 1 with water flood only.
Run No. 2 with 0.1% SN70*, *SN70 is oxyethylated linear primary alcohol.
0.1% NaOH, 0.1% CQ
Run No. 3 with 0.1% NaOH
Run No. 4 with 0.1% NaOH, 0.1% CQ
Run No. 5 with 0.1% GS6 GS6 is a solution of lauryl diethanolamid and trisodium phosphate.
Run No. 6 with 0.1% Triton X100

General note: The above runs were made all in one 8-hour day period. The Liberty crude oil contains clays, hence the poor showing for Triton X100.

RUN NO. 1

| Cumulative fluid | Cumulative Oil | Cumulative oil | $H_2O$ | Cumulative $H_2O$ | O/W | Oil left in sand pack |
|---|---|---|---|---|---|---|
| 22 | 9 | | 13 | | 0.69 | |
| 44.4 | 2.4 | 11.4 | 20 | 33 | 0.12 | |
| 63.2 | 0.8 | 12.2 | 18 | 61 | 0.04 | |
| 80.1 | 0.9 | 13.1 | 16 | 77 | 0.06 | 31.9 grams of oil left |
| 104.5 | 1.5 | 14.6 | 23 | 100 | 0.06 | behind. 19.4/51.3 = |
| 187.3 | 2.8 | 17.4 | 80 | 180 | 0.035 | 37.8% recovery |
| 257.3 | 2.0 | 19.4 | 68 | 248 | 0.029 | |

RUN NO. 2

| | | | | | | |
|---|---|---|---|---|---|---|
| 22.5 | 21.5 | 21.5 | 1 | 1 | 21.5 | 6.4 grams of oil left |
| 68.5 | 27 | 48.5 | 19 | 20 | 1.4 | behind. 56.5/62.9 = |
| 212.3 | 8 | 56.5 | 135.8 | 155.8 | 0.06 | 90% recovery |

RUN NO. 3

| | | | | | | |
|---|---|---|---|---|---|---|
| 21 | 21 | 21 | 0 | 0 | — | 5.3 grams of oil left |
| 66.3 | 32.3 | 53.3 | 13 | 13 | 2.5 | behind. 65.3/70.6 = |
| 215.3 | 12 | 65.3 | 137 | 150 | 0.088 | 92% recovery |

RUN NO. 4

| | | | | | | |
|---|---|---|---|---|---|---|
| 20.5 | 20.5 | 20.5 | 0 | — | — | |
| 43.4 | 10.1 | 30.6 | 12.8 | 12.8 | 0.79 | |
| 77.1 | 7.6 | 38.2 | 16.1 | 38.9 | 0.47 | |
| 98.6 | 2.8 | 41.0 | 18.7 | 57.6 | 0.15 | 3.4 grams of oil left |
| 113.6 | 1.2 | 42.2 | 13.8 | 71.4 | 0.087 | behind. 47.8/51.2 = |
| 131.3 | 3.0 | 45.2 | 14.7 | 86.1 | 0.204 | 93.6% recovery |
| 149.3 | 1.6 | 46.8 | 16.4 | 102.5 | 0.098 | |
| 325.3 | 1.0 | 47.8 | 175 | 277.5 | 0.036 | |

RUN NO. 5

| | | | | | | |
|---|---|---|---|---|---|---|
| 22.3 | 13.3 | | 9.0 | | 1.48 | |
| 66.6 | 7.3 | 20.6 | 37.0 | 46 | 0.197 | |
| 105.6 | 4.0 | 24.6 | 35.0 | 81 | 0.114 | |

| | | | | | |
|---|---|---|---|---|---|
| 129.5 | 1.9 | 26.5 | 22.0 | 103 | 0.086 |
| 151.4 | 0.9 | 27.4 | 20.0 | 143 | 0.054 |
| 188.6 | 1.1 | 29.6 | 16.0 | 159 | 0.069 |
| 248.3 | 2.7 | 32.3 | 51.0 | 210 | 0.053 |
| 261.8 | 0.5 | 32.8 | 19.0 | 229 | 0.026 |
| 289.1 | 0.3 | 33.1 | 27.0 | 256 | 0.011 |
| 315 | 0.9 | 34.0 | 25.0 | 281 | 0.036 |
| 340.9 | 0.8 | 34.9 | 25.0 | 306 | 0.032 |
| 363.7 | 0.3 | 35.2 | 22.5 | 328.5 | 0.013 |
| 390.9 | 0.2 | 35.4 | 27.0 | 355.5 | 0.007 |
| 410.6 | 0.2 | 35.6 | 19.5 | 375.0 | 0.010 |
| 435.1 | 0.5 | 36.1 | 24.0 | 399.0 | 0.021 |

25.7 grams of oil left behind. 36.1/61.8 = 58.5% recovery

RUN NO. 6

| | | | | | |
|---|---|---|---|---|---|
| 49.7 | 12.7 | 12.7 | 37 | 37 | .34 |
| 73.6 | 1.9 | 14.6 | 22 | 59 | 0.087 |
| 90.1 | 1.0 | 15.6 | 15.5 | 74.5 | 0.064 |
| 113.8 | 0.7 | 16.3 | 23 | 97.5 | 0.03 |
| 132.6 | 0.8 | 17.1 | 18 | 105.5 | 0.04 |
| 169.3 | 1.7 | 18.8 | 45 | 150.5 | 0.038 |
| 191.8 | 0.5 | 19.3 | 22 | 172.5 | 0.023 |
| 211.4 | 0.6 | 19.9 | 19 | 191.5 | 0.031 |
| 232.9 | 0.5 | 20.4 | 21 | 222.5 | 0.024 |
| 257.9 | 1.0 | 21.4 | 24 | 246.5 | 0.042 |
| 378.1 | 1.2 | 22.6 | 119 | 365.5 | 0.010 |

35 grams of oil left behind. 22.6/57.6 = 39.3% recovery

The use of sacrificial material containing multiple functional groups competitive with the functional groups of the detergent has already been exhibited in the use of lignosulfonates, sugars and borax as sacrificial material. Also, the use of lignosulfonates, sugars and borax in the above formulations illustrates their use separately or in various combinations with their respective type of detergents.

To check on the use of spontaneous emulsifiers to emulsify crudes, a drop of Barber's Hill crude oil was placed on a microscope slide. Then a drop of 0.1 percent Triton X100 (ethoxylated nonylphenol) was placed in substantial adjacency with the drop of oil, and was then added to extend it to the oil, with no noticeable effects resulting. When the 0.1 percent Triton X100 also contained diluted CQ (causticized calcium lignosulfonate), the oil, upon being contacted by a droplet, comprised as aforesaid, shoots across the droplet, emulsifying enroute. Silicones (Union Carbide Corporation L76, L77 and L79) in aqueous solutions added alone, did not affect the crude oil. However, when these silicones were added in combination with NaOH (0.002% silicones/0.1% NaOH), they broke the oil drop into minute droplets and launched them across the aqueous droplet to reassemble on the other side thereof as an oil droplet. No detergent was present to emulsify. The caustic (NaOH) prevented the silicones from oil wetting the silica surfaces. In other droplet tests it had been observed that caustic alone would not spontaneously emulsify this (Barber's Hill crude) oil. However, with other oils, such as Liberty crude (from hereinabove), caustic had appeared to show spontaneous emulsion when acting alone.

The addition of sugar (or of a polyhydrol material as starch or dextrin) gave an emulsion front that moved substantially 6 inches below the oil front. This demonstrated that sugar, as a sacrificial agent, plated out or coated the silica anchor sites, thus allowing the detergent Triton X100 to emulsify the oil.

The use of the aforesaid spontaneous emulsifiers enables the use of an oil bank technique in which a formation filled with detergent and with a spontaneous emulsifier will, upon standing, form an oil bank of primary production. This enables maximum oil production with a minimum amount of chemical usage.

Oil banks may also be formed by the use of unstable emulsions which will emulsify the oil, then, as the emulsion breaks an oil bank is formed. This limits "fingering" or early breakthrough of water. Accordingly two runs to be listed immediately hereinbelow were made by the herein applicants for an oil company, known as Yacimientos Petroliferos Fiscales, an adjunct of the Argentine government. The crude oil tested consisted of 2 parts Señal Picada (oil) and one part Catriel Oeste (oil); Senal Picada being an intermediate paraffin with a naphthenic base, viscosity 93 CS (centistokes) at 30° C.; Catriel Oeste being an asphaltic base oil, viscosity 180 CS at 30° C. The specific gravity of the aforesaid combination of oils was 0.915.

| Run No. 2 | | | Run No. 1 | | |
|---|---|---|---|---|---|
| GS–9* | Cumulative Totals | | $H_2O$ Flood | | Corrected |
| $H_2O$ | Oil | Total Fluids | $H_2O$ | Oil | Total Fluids |
| 3.80 | 19.20 | 23.0 | 0.935 | 19.3 | 20.235 |
| 91.95 | 36.00 | 127.95 | 91.50 | 31.5 | 123.0 |
| 165.15 | 49.70 | 214.85 | 232.00 | 36.3 | 268.3 |
| 244.39 | 59.06 | 303.45 | 300.00 | 38.5 | 338.5 |
| 328.89 | 63.56 | 392.45 | 405.00 | 41.7 | 446.7 |
| Residual Oil | 7.0 | | Residual Oil | | 29.0 |
| Total | 70.56 | | Total | | 70.7 |

63.56/70.56 = 90% recovery   41.7/70.7 = 58.6% recovery
*GS–9 is an ethoxylated linear alcohol with NaOH, lignosulfonate, and sugar (concentration .1%). This demonstrated to observing officials the formation of oil banks with light oils.

It has already been demonstrated in a first experiment that oil banks can be used of heavier crudes, and after one pour volume of chemical solutions (0.1 percent) followed by a pour volume of fresh or salt water, 99 percent recovery can be obtained from a gravel pack. In said first experiment, when the caustic concentration was reduced, then the oil particle size increased, while the emulsion stability was reduced.

A sample of Nacogdoches crude, 22 A.P.I. gravity, had 48.7 surface tension. When causticized the surface tension was reduced to 25.0. A solution, 0.1 percent concentration, of Scheromid SLM, surface tension 29.0; or Richamid CD, surface tension 30.3, both emulsified the oil, both being lauryl diethanolamids. However other detergents, with similar surface tensions will not emulsify the oil. The HLB (hydrophilic-lyophilic balance which is a measurement of oil-water solubilities also has importance. In order to emulsify the surface tension of the oil and of the water must be in close relationship. Two detergents with proper HLB will not emulsify the oil if their surface tensions are not in consonance with the aqueous phases. However if blended to the correct surface tension, they emulsify the oil. The use of HLB and surface tension is illustrated by the following typical examples. A sample of Texas Crude, 15 A.P.I. gravity was tested by the following 0.1 percent detergents:

CHEMICAL CHARTS

| Name of Detergent | Type of Detergent | Chemical Species | Surface Tension | Caustic-ized oil | Detergent with oil |
|---|---|---|---|---|---|
| Emulser OM | non-ionic | alkanolamine polyglycol fatty acid condensate | 29.0 | no good | fair |

| Name | Type | Chemical | Value | Rating |
|---|---|---|---|---|
| Rexowet GR | anionic | sulfonated diester | 26.3 | fair fair good |
| Monomulse S | non-ionic | alkanolamide of stearic acid | 30.3 | fair fair |
| CO 610 | non-ionic | ethoxylated nonyl phenol | 31.6 | no good good |
| Caustic | | sodium Hydroxide (NaOH) | | no no good good |
| Schercomide MO | anionic | modified diethanolamide of lauric acid | 33.0 | no good fair |
| BC 610 | non-ionic | ethoxylated tridecyl alcohol | 30.3 | fair fair |
| Richamid CD | non-ionic | coconut diethanolamide | 30.3 | no good fair |
| Cindet GE | anionic | organic salt of an alkylarylsulfonate | 27.7 | fair fair |
| Solar TE | non-ionic anionic | modified amide | 29.0 | no no good good |
| Monowet MO70 | anionic | dioctyl ester of sodium sulfosuccinic acid | 23.7 | no no good good |
| SD 12 | anionic | dodecyl benzene sulfonic acid | 29.0 | poor fair |
| Cedamide A | non-ionic | lauric diethanolamide | 30.3 | no fair-good good |
| RC 630 | non-ionic | Ethoxylated dodecyl phenol* | 32.9 | no fair-good good |
| WT 27 | anionic | sodium alkylnapthalene sulfonate | 25.0 | no fair-good good |
| Schercolene SB | anionic | solvent surfactant blend | 30.3 | no no good good |
| Schercomid SLM | non-ionic | diethanolamide of lauric acid | 29.0 | no good fair |
| Prelube 200 | amphiteric | sodium salt of poly-ethoxyamino acid | 35.6 | no good fair |
| B350 | non-ionic | ethoxylated nonyl phenol* | 32 | non-fair fair good |
| Ricomide LA | non-ionic | diethanolamide of lauric acid | 35.6 | fair-poor good |
| RC 620 | non-ionic | ethoxylated dodecyl phenol* | 33 | fair-good good |
| Schercomide MHA | anionic | modified diethanolamide of lauric acid | 31.6 | no good poor |
| Rozak 326 | anionic | phosphated alcohol polyethanolamine condensate | 39.5 | no no good good |
| Surfotex L70 | non-ionic | polyethanolamine condensate of a fatty acid | 43.5 | no fair-good good |
| Roterge 332 | non-ionic | alkyolamide | 31.6 | no good good |
| Schercomid | non-ionic | diethanolamide of coconut oil | 26.3 | no good poor |
| Sulfobetaine DCH | ampho-teric | coco ammonium sulfonic acid betaine | 35.6 | no good good |
| Velvetex BC | ampho-teric | lauryl betaine | 39.5 | no good poor |
| Santomerse S | anionic | alkylaryl sulfonate | 32.9 | no no good good |
| Texamine 1839 | cationic | tertiary amine | 26.3 | no no good good |
| Solution 6 | non-ionic | solvent surfactant | 30.3 | poor poor |
| Strodex PK90 | anionic | organic phosphate ester | 27.7 | |
| Wetex 85P | anionic | phosphated alkylaryl sulfonate | 32.9 | poor poor |
| 82 | non-ionic | diethylanomide of lauric acid | 32.9 | poor fair |
| Stephan HSA7 | non-ionic | fatty acid alkylomide | 39.5 | poor poor |
| Cocoamine | cationic | lauryl amine | 26.3 | no no good good |
| 79S | anionic | alkanoamine sulfonate | 33.0 | poor fair |
| E-9 | non-ionic | ethoxyluted laurate | 42.2 | poor poor |
| Lipal 6TD | non-ionic | ethoxylated tridecyl alcohol | 29.0 | poor poor |
| Adogen 462 | cationic | dimethyl dicoco quaternary salt | 29.0 | poor fair |
| Brig 96 | non-ionic | ethoxylated oleyl ether | 35.6 | poor poor |
| Kera Merse 153 | non-ionic/anionic | blend of wetting agents | 29.0 | poor poor |
| Aerosol OT | anionic | dioctyl ester of sodium sulfosuccinic acid sulfated | 30.3 | poor fair fair+ |
| Ahcowet RS | anionic | fatty acid ester | 33.0 | poor |
| Isothan DL1 | cationic | dialkyl dimethyl ammonium bromide | 31.6 | no poor good |
| Dianol SWP | anionic | sulfosuccinic acid derivative | 30.3 | fair+ poor |
| 301 | | Tall oil derivative (spontaneous emulsifier) | 32.9 | poor good |
| Richanol S1300 | anionic | sodium ethoxylated lauryl sulfate | 33.0 | fair+ poor |
| Morosol 3F | non-ionic | ethoxylated oleic acid ethoxylated | 33.0 | poor poor fair+ |
| SN 70 | non-ionic | linear alcohol | 42.2 | poor |
| Moropen 85 | non-ionic | ethoxylated stearate | 25.0 | poor fair |

When the above listed detergents were further tested by mixing, 0.1 percent each with 0.1 percent of caustic and 0.1 percent lignosulfonate, 99.7 percent water, and three volumes of the immediately hereinabove set forth solution mixed with one volume of the aforesaid Texas Crude Oil, 15 A.P.I. gravity, and the shake test applied, test tube results indicated that the four most applicable detergents, price considered, were non-ionic, and as follows:

| Name of detergent | Chemical species | Surface tension balance | Hydrophilic-lyophilic (HLB) |
|---|---|---|---|
| * Items listed in chart above | | | |
| B 350 | ethoxylated nonyl phenol | 32 | 11.7 |
| CO 610 | ethoxylated nonyl phenol | 31.6 | 11.7 |
| RC 620 | ethoxylated dodecyl phenol | 33 | 12.1 |
| RC 630 | ethoxylated dodecyl phenol | 32.9 | 12.1 |

It should be noted that various types of crude oils have been found to require detergents of varying surface tensions and HLB's as those best suited to serve in their respective recoveries. Also it should be noted that when two or more are used in admixtures, their surface tensions and HLB's are additive with their concentrations and thus detergents that normally show as No good, Poor, or Fair in the shake tests, can be blended in combinations that will test as satisfactory. Also demands of performance on the detergents, and combinations thereof, will vary in accordance with their use. For example, with a heavy tar sand, and no intercommunication between a plurality of wells is to be had, a "huff and puff" method would be advised where injection and production would take place through a single well. In this case a stable emulsion is desired. However with the "flood" system comprising injection into one or more wells and production from one or more other wells, it is often desirable to utilize an unstable emulsion to form an oil bank to prevent "fingering."

The unstable emulsion can be followed by stable emulsifiers, which may then be followed by fresh or salt water, or viscous water flood for optimum oil production at minimum chemical cost. The detergents employed, as set forth, are blends incorporating spontaneous emulsifiers, solvating agents, penetrants and sacrificial material as required by the formation and used as herein described.

To prove the use of an invert emulsion to seal off the formation a solution of 1 percent alum ($KAl(SO_4)_2$) was introduced into a watered out tube containing Barber's Hill (Chambers County, Texas) crude. This was followed by a solution of causticized Triton X100 (ethoxylated nonyl phenol) containing CQ (causticized calcium lignosulfonate), 0.1 percent solution. An invert emulsion immediately formed and plugged the tube.

Figure 2:
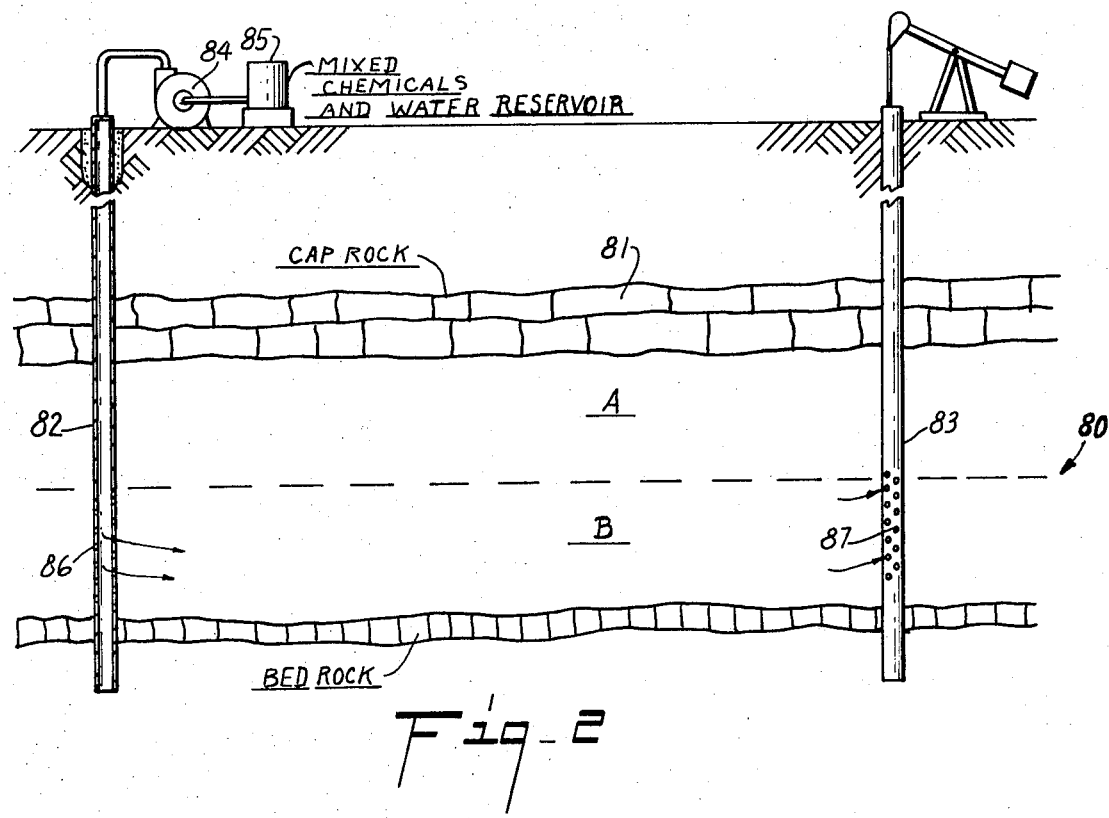
FIGS. 2 and 3 are sectional elevational views, partially diagrammatic, showing successive steps in the flooding of multiple permeability formations.
Figure 3:
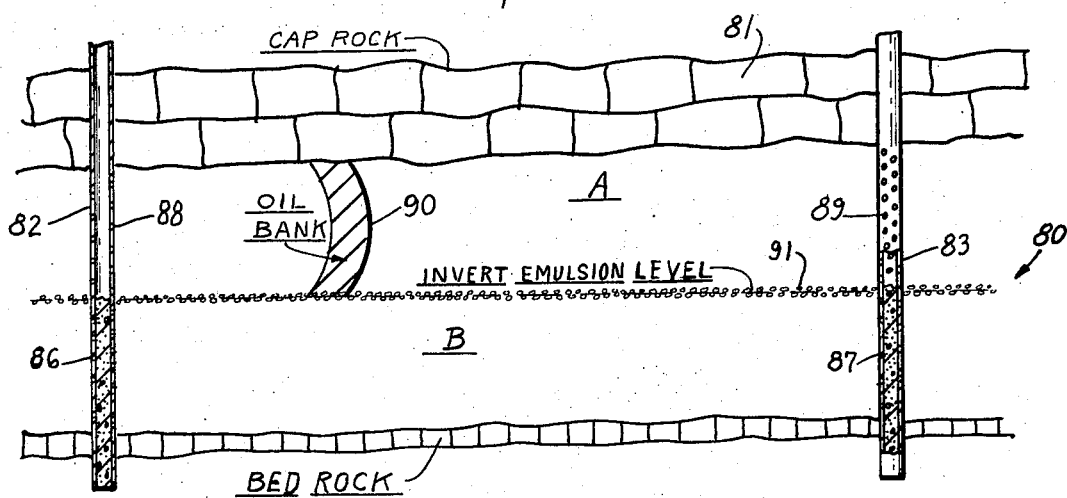

As indicated diagrammatically in FIG. 2, an oil bearing reservoir sand or formation 80 is shown including an upper zone A of low permeability under and adjacent to a cap rock or capping formation 81, and a lower zone B, under the zone A, and of higher permeability. This reservoir 80 is shown pierced by an injection well 82 and a producing well 83. The injection well 82 is shown serviced from the surface by a pump 84 which takes suction from a mixing tank 85 comprising a Mixed Chemicals and Water Reservoir. Chemical is injected through perforations 86 to sweep the oil from the lower, higher permeability zone B in through perforations 87 in the producing well 83, which is indicated diagrammatically as having its oil lifted by a conventional lift pump as one conventional means of production With the zone B swept clean of oil by chemical sweep, a "slug" of water is then injected down the injection well 82 into the production zone B, followed by a solution of alum or other chemicals capable of forming invert emulsions with the oil, bi-valent and tri-valent metal ions and their salts being water soluble and thus well suggested for this purpose. When the zone B has been thus flooded perforations 86, well 82, and perforations 87, well 83, are both cemented or sealed off as indicated in FIG. 3. Then areas of the respective wells 82, 83, are perforated, in the upper, lower permeability zone A, by respective perforations 88 and 89, FIG. 3. Mechanical flood then proceeds.

If a poor emulsifier is used in this chemical flood, an oil bank 90 is formed. However, for the objects of this invention such a bank is not required. The important issue in this invention is that wherever the emulsion contacts the alum solution, an impervious invert emulsion 91 forms. Thus migration of the chemical penetrant is prevented, and the chemical used in the flooding of the upper zone A remains in such zone.

Note that the above solution to this type of problem has been stated in the objects of the invention and test results. However, the invention is not limited to the disclosure of FIGS. 2 and 3, but has applicability, with minor technique variations, to sweep a plurality of vertically adjacent beds or zones which may have a random plurality of permeabilities.

This technique can be used to insert a plugging solution, such as alum, into the aqueous phase, the emulsion then being allowed to come into contact with the alum solution thus to inhibit "coning" of a well. For information it is stated that "coning" comprises the rising of water through an oil table or zone, due to too high a pumping rate of a producing well. This results since the oil, lighter but more viscous, does not flow as readily, responsive to the fast pull of the pump, as does water. However, since the emulsion-alum contact forms a barrier, the water is spaced from the well thereby. The prevention of coning by this method, eliminates the costs of "frac" and "cement" jobs conventionally used today. This technique can also be used to seal "faults," fractures or old well holes in capping formations, and to prevent chemical migration into the water leg of a formation.

Invert emulsions may be utilized in drilling muds for suspension and plugging, but such must be coupled with weight materials, such as conventional barite. Often oil wet solids such as "Bentones" (amine treated bentonite) may be used to aid in suspension and plugging, also rubber materials. The use of causticized naphthenic based crudes coupled with alum dissolved in aqueous phase can be used to form such invert emulsions. Refined oils, as diesel oils, to which fatty acids and sulfonated hydrocarbons containing hydroxyl groups can be used to form inverted emulsions. The novelty involved resides in the unique combination of the use of di-valent and tri-valent metals and their salts, to form invert emulsions with emulsified crudes or emulsified refined oils. Then, when such new combinations are incorporated with drilling mud additives, a novel type of invert drilling mud is claimed with cheaper crudes taking the place of expensive refined oil in some combinations in addition to these other ingredients added in combination to form inverted emulsions in drilling mud, as aforesaid.

Oil emulsified in three volumes of water has a viscosity of approximately 2 Centipoise. Thus, in the case of crudes, even though the volume of the emulsion is greater more oil can be pumped through a pipe with the same rate of pumping, since the pumping rate is directly proportional to viscosity. An oil of 20 Centipoise viscosity, when reduced to 2 Centipoise viscosity, will flow at a 10-fold rate, pumping conditions remaining the same. Since the crude in emulsion has approximately four times its original volume, this means that 2-½ times as much oil may be pumped when thus emulsified. The use of ocean water, or of a salt water, will allow emulsions to be made that are stable at below 32° F. temperatures. For this use it is beneficial to incorporate, although not necessary, materials to cause spontaneous emulsification. For example, lignosulfonates, silicones, caustic, tall oil derivatives as set forth hereinabove with relation to tests and experiments. Such apply when the oil stands in the pipeline and the emulsion breaks, the oil then being more readily reemulsified by pumping. The stability of the emulsion can be adjusted by the use of one or more emulsifiers, or the use of an emulsifier activator, or the use of the combinations therein. The variations of the concentrations of the above materials can be utilized to vary the particle size and stability of the emulsion. Corrosion inhibitors may be introduced into the formulation to combat corrosive conditions. For pipeline usage, the combinations may be either stable or unstable in nature.

The emulsification formulations can include the addition of materials to penetrate and "sheet" oil off of the sands or formation surfaces. These materials include sugars, dextrines, starches, amines, ethanolamines, and polymers of salts and esters, silicones coupled with caustics, salts, borax, phosphates and silicates. This action can easily be demonstrated by the "sheeting" action of the shake test. That is, when a test tube containing the emulsified oil together with one of the immediately hereinabove listed materials, is shaken, the oil runs off of the walls of the test tube and does not cling thereto.

The use of caustic sodium hydroxide or sodium borate solutions will cause calcium bentonite to convert to sodium bentonite. Sodium bentonite in low salinity water will swell up to 32 times its dried volume. This reduces the permeability of formations, but this swelling can be prevented by the use of 45 parts per million salt water. However, if caustic sodium hydroxide and sodium borate are used together, with the sodium borate concentration being approximately 50 to 100 percent by weight in ratio to that of the sodium hydroxide, the swelling of the bentonite can be diminished at a concentration of 25,000 parts per million sodium chloride. At 30,000 parts per million sodium chloride, the above mixture of sodium hydroxide and sodium borate will cause the swelling of the bentonite to be equal to that of bentonite treated with sodium hydroxide or sodium borate alone in proportion of 45,000 parts per million of sodium chloride. This allows caustic materials to be used in fresher waters than those waters in which they have heretofore been used.

Often when working with heavy crudes, or high paraffinic crudes, neither caustic nor detergent, nor their combinations, will emulsify the crude. However, if a solubilizer is incorporated, crude oil can be emulsified. This solubilizer may be another crude or refined oil. For example a Nipomo (California tar sand of road asphalt consistency) crude, when treated with an emulsified Santa Maria crude (a California naphthenic base crude, from near Nipomo), formed stable emulsions. The Santa Maria crude was emulsified by 0.1 percent sodium hydroxide. The Nipomo crude when treated by caustic failed to emulsify. The Santa Maria crude, when added to the Nipomo crude, would eventually dissolve it, however emulsified Santa Maria crude readily emulsified the Nipomo crude. This proves a synergistic result is obtained by the combination of a solubilizer with an emulsification activator.

Another test sample comprised a Texas paraffinic crude which had failed to be emulsified by caustic or detergent, or the combination of the two. However an oil soluble detergent RM 410 (an acid ester with an aromatic hydrophobic base) was added to another crude oil in 50—50 percent mixture and both emulsified, the emulsified admixture then being added in ratio of 0.2 percent to the said Texas paraffinic base crude with the result that the Texas paraffinic crude readily emulsified. This result further supported the use of oil soluble detergents to aid in the dispersion of a crude oil. In view of the foregoing the statement that spontaneous emulsifiers aid in dispersion of the crude, can be supported.

The use of a displacing fluid following emulsification reduces the amount of chemical needed to recover the oil. By way of example and demonstration, two glass tubes 2 feet in length, 1 inch in diameter, were filled with a light Texas tube, as hereinabove described, including 10–15 mesh sand or gravel particles, as described in FIG. 1. A solution of 0.1% NaOH 0.1% Triton X100 (ethoxylated nonyl phenol), and 0.1% CQ (causticized calcium lignosulfonate), and 0.5 percent sugar were used in combination in both flood tests. In Run No. 1, 212 c.c. of solution produced 77.3 grams out of total oil of 78.3 grams, 98.8 percent recovery. In Run No. 2 only 18 c.c. of the same solution was used followed by 25 c.c. of 1.0% CMC (carboxy methyl cellulose) in 40,000 parts per million of salt, followed by 30 c.c. of water, for a total of one pour volume (73 c.c.) of solution for a yield of 77 grams out of a total 78.3 grams, 98.5 percent recovery. These tests demonstrate that displacing fluids can be used to reduce the volumes of solutions required to recover the oil.

When working with clays in sand packs, if insufficient amount of sacrificial material is used, real cleaning occurs only in the area saturated by the sacrificial material because the detergent will have "plated out" in the area just beyond this area of sacrificial material saturation. This means that by controlling the amount of sacrificial material the area of detergent action in the reservoir may be controlled. Detergents can be prevented from being produced in the water leg of a reservoir or an emulsion flood can be stopped at a legal boundary in a reservoir.

Figure 4:
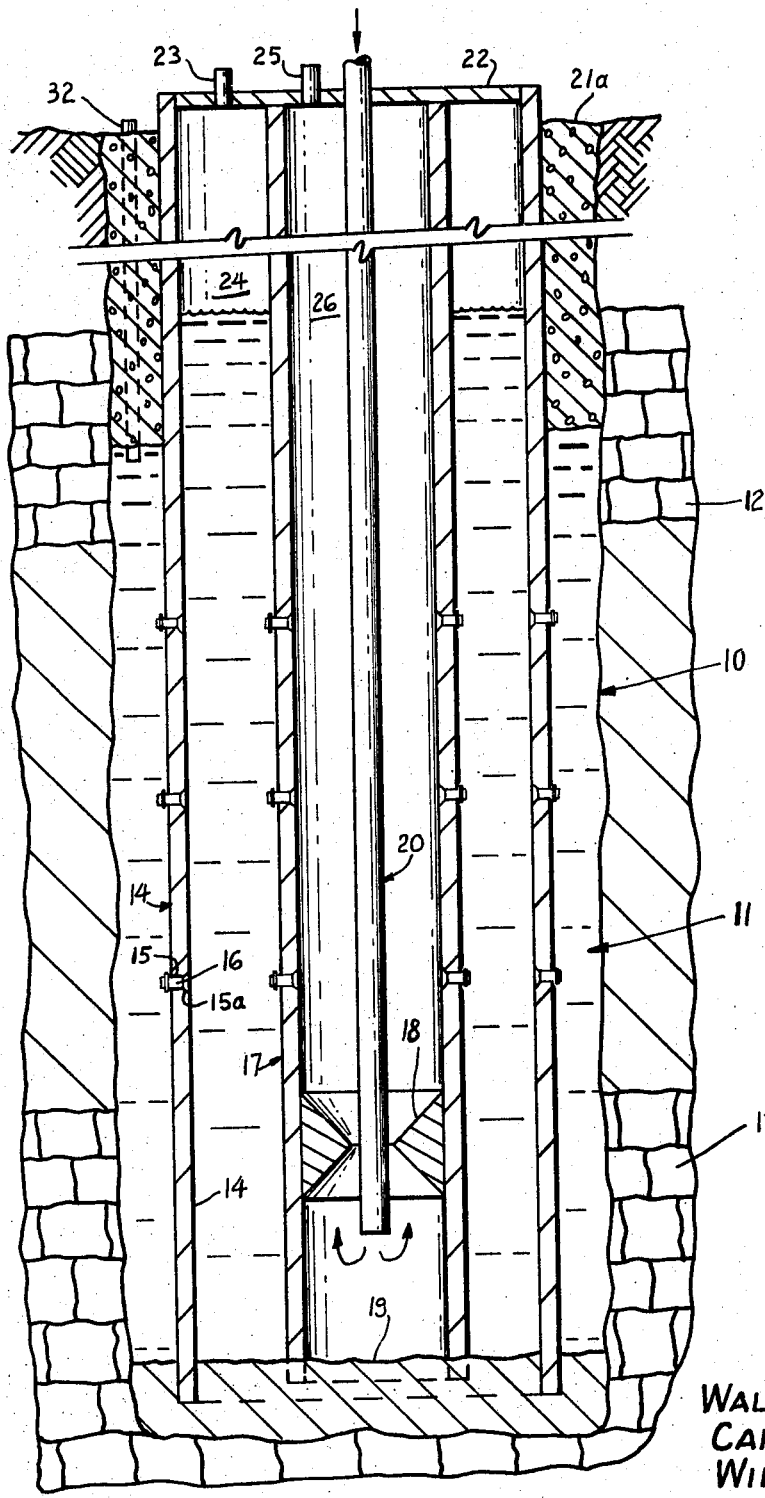
FIG. 4 is a sectional elevational view, partially diagrammatic, showing concentric tubular structures employed in a method of lifting oil from producing formation to well head.
Figure 6:
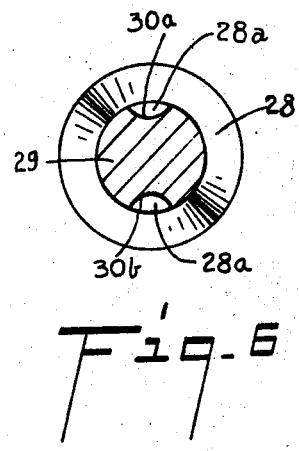
FIG. 6 is a sectional elevational view, taken along line 6—6 of FIG. 5.

Referring now to Figures 4, 5 and 6, structure is shown for a method of lifting crude oil from a formation by means of emulsions. A well bore 10 is shown in FIG. 4 as having penetrated the formation of an oil reservoir 11 bounded by a capping rock formation 12 upwardly, and below by a bedding formation 13. A special casing 14 is shown as having been inserted into the well bore 10. Such casing 14 has valve ports 15 therein comprised of bores inwardly countersunk at 15a as shown in FIG. 5, to receive flapper valves 16 therein, to be hereinbelow described in detail.

Inside of the special casing 14 there is inserted a smaller diameter casing 17, also penetrated in the producing zone by ports 15 to receive valves 16 therein, opening inwardly. Below the lowest valve a venturi structure or restriction 18 may be affixed within the smaller diameter casing or pipe 17 slightly below the lowest port 15 therein, also this desirable feature is not completely essential for the functioning of the invention to be set forth hereinbelow. The lower end portions of the concentric pipes or tubings 14 and 17 are shown seated in a cement plug 19 at the bottom of the well bore 10. A small diameter pipe 20 is inserted along the axis of the central pipe 17 until the bottom of such pipe is below the lowest valve 16 or below the venturi 18. The annulus above the outer casing highest port 15 is cemented with cement 21 terminating downwardly at a point above the highest port 16 in the tube 14. Tubes 14 and 17 are sealed at the top by plate 22, the plate 22 having aperture means provided therein to receive a flow nipple 23 for the selective delivery therethrough of gas, into the annular space 24 between the tubes 14 and 17.

Also a production outlet 25 is installed in the plate 22 to communicate with annular space 26 between the tubes 17 and 20. Additionally an axial bore 27 is provided through the plate 22 for the insertion therethrough of the chemical injection tube 20. The concentric pipes 14, 17 and 20 are held centered by a cement plug 21 at a substantially ground level.

In detail, each flapper valve 16 is constructed to include a countersink shaped head 28 of dimension firmly to seat in a countersunk recess 15a which communicates, as aforesaid with a respective port or bore 16 through which extends the shank or stem 29 of the flapper valve. The shank or stem 29 has parallel, opposed, longitudinally extending grooves 30a, 30b, which run for the length thereof. The inner end of each shank or stem 29 has a retainer or cotter pin 31 therethrough at a spaced distance from the outer surface of the respective tubine or casing when the flapper valve 16 is seated, thus controlling some travel space for the flapper valve 16, and also acting as a keeper or retainer therefor.

In operation, fluid, (oil, gas and water), flow from the formation 11 into the bore hole 10. Hydrostatic head pressure in the bore 10 urges inwardly first against the outer pipe 14, also against the respective spaces 28a at the inner ends of each groove 30a, 30b, under respective countersink heads 28, thus causing these flapper valves to unseat and move inwardly to cotter pin stopped position. Fluid thus flows through respective grooves 30a, 30b, of each flapper valve 16 in the outer pipe 14, into the annular space 24 between pipes 14 and 17.

At a predetermined time pressurized gas is introduced through the flow nipple 23 into the annulus 24. This increase in pressure acts against the flapper valve heads 28 and urges them closed in the outer pipe 14 while urging open the correspondingly constructed flapper valves 16 in pipe 17. The fluids from the annulus 24 may now pass into the annulus 26.

The introduction of gas through the flow nipple 23 is appropriately terminated when the hydrostatic head in the annulus 24 falls to less than the hydrostatic pressure of the reservoir 11 acting in the well bore 10. The flow nipple 23 is now relieved so that the pressure may fall in the annulus 24, causing the flapper valves 16 in the outer tube 14 to open, and the flapper valves 16 in the central tube 17 to close. At this stage the annulus 26 is filled with produced fluids, and these fluids are emulsified by injecting emulsifying chemicals, hereinabove described, through the axial tube 20 to be produced through an outlet or discharge nipple 25 in the top closure plate 22.

The venture 18 is disposed in the central pipe 17 above the lower end of the axial pipe 20 to lend turbulence to the upward flow of the chemically treated water, thus to aid in the emulsification of the oil. Optionally water alone may be injected down the axial pipe 20 to produce the oil in form of oil droplets transported upwardly by the water which has a higher or heavier specific gravity than the oil.

As another optional method, the pipe 14 (outer) may be eliminated, and pressurized gas injected from the top of the well through the alternate pipe 32, shown in dotted lines in FIG. 4, as passing downwardly through the aforesaid cement plugs 21a, 21 to communicate with the well bore 10. In this case the pressurized gas acts to build pressure in excess of that in the annulus 26 to open the flapper valves 16 in the pipe or tube 17, thus to produce into the inner annulus 26.

In support of the foregoing, the inclusion of a small quantity of chemicals, as hereinabove described, into an injection well in an old Texas oil field, (one cup of detergent per day), eliminated the build up of invert emulsified crudes on the injection well face. The particular emulsifier in this case was diethanolamide of lauric acid.

Figure 7:
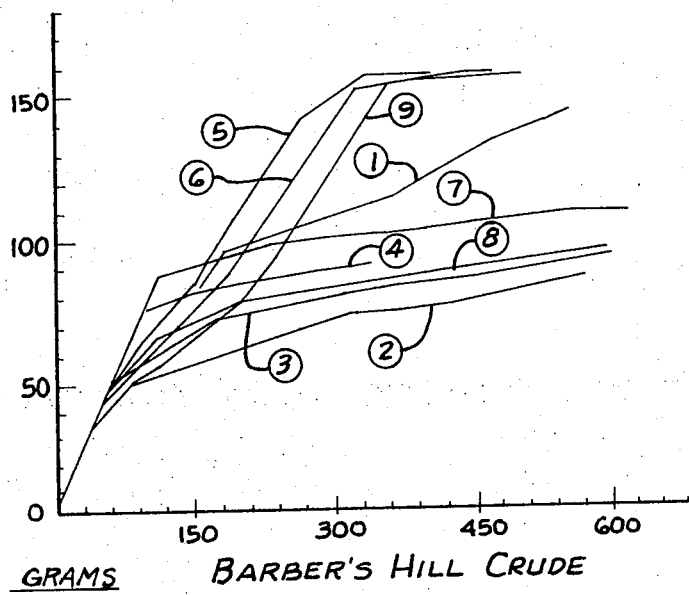

Referring now to the data introduced hereinabove, FIGS. 7–9, inclusive, may be considered in detail. Produced oil in grams, cumulatively, as ordinates, plotted against produced fluids in grams, cumulatively, as abscissae, form basis for these graphs. In FIG. 7 3/16 inches ordinate distance represents 10 grams of oil cumulatively produced, and 3/16 inches abscissa distance represents 30 grams of fluids, cumulatively produced. The runs 1–9, inclusive, Barber's Hill crude, are designated by corresponding encircled numerals with lead lines therefrom to the particular curve or plotted graph line for the respective run thus plotted. Considering runs 1–3, it is apparent that Triton X100 alone (Run No. 2), is comparable with water flood only (Run No. 3) and that the modified Triton X100, (Run No. 1), gave 50 percent more oil. As to Run No. 4 which employed only Triton X100, slightly more primary oil was produced due to a small oil bank forming when the run was shut down for approximately 20 hours. Run No. 7, water flood only, also showed an increase in production due to an oil bank forming during an approximately 20 hour shut down. Runs 5 and 6 showed immediate emulsification when the chemical came in contact with the oil. When water was substituted for the chemical in Run 5, after 140 ml. of the solution had been used, 98 percent of the oil was produced. In Run 6 water was substituted for the chemical after 200 ml. of the solution had been used, and 99 percent recovery was obtained. Runs 8 and 9 were to produce three oil banks with Triton X100, Run 8, giving highest yield or 60.3 percent. With Run 9 the caustic was halved and chemical feed stopped at 235 ml. and water substituted, the recovery again being 99 percent. For purposes of clarity, and not to clutter the graphs, the percentages recovery are not listed on the graphs but are set forth on the charts. A detergent that shows little effect on a crude can be effectively altered by chemical addition.

Figure 8:
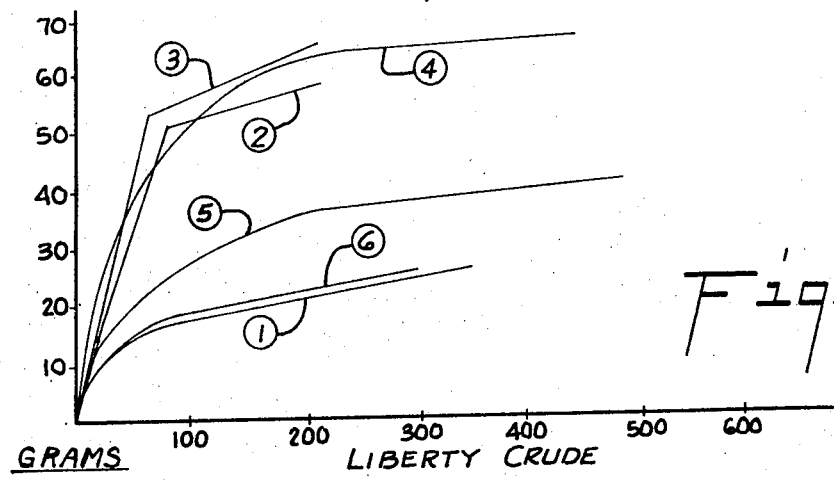

Referring now to FIG. 8, and to data and chart, Runs 1–6, a crude oil from Liberty, Tex., taken directly from a pumping well, and discovered to contain clays, was run through sand packed tubes, as hereinabove described with relation to apparatus shown in FIG. 1. Comparing Run No. 1, primary water flood, with Run No. 6 in which 0.1 percent Triton X100 (ethoxylated nonyl phenol) was used in solution, the Triton X100 showed an affinity for the silica surfaces and for the clays, with net result between Runs No. 1 and No. 6, as plotted.

A modified 0.1 solution lauryl diethanolamide and trisodium phosphate (GS–6), as Run No. 5 showed a lower degree of affinity for clay and silica surfaces than did the Triton X100, (plotted higher). A non-ionic SN70 (oxyethylated linear primary alcohol) coupled with caustic and a spontaneous emulsifier in Run No. 2, gave 90 percent recovery, (plotted still higher). However caustic alone, or with a spontaneous emulsifier (caustic and calcium lignosulfonate, CQ), gave the highest results, 92 and 93 percent recovery, respectively, in respective Runs No. 3 and No. 4. In general the runs immediately hereinabove described were employed to arrive at comparisons between various caustic detergent formulations as employed in crude recovery. The higher plotting runs utilized the emulsion activator, caustic, in their formulation (Runs 2, 3 and 4), whereas the lower plotting runs (Runs 1, 5 and 6) did not employ caustic. (The trisodium phosphate content of GS–6 gave a pH of 9.)

Figure 9:
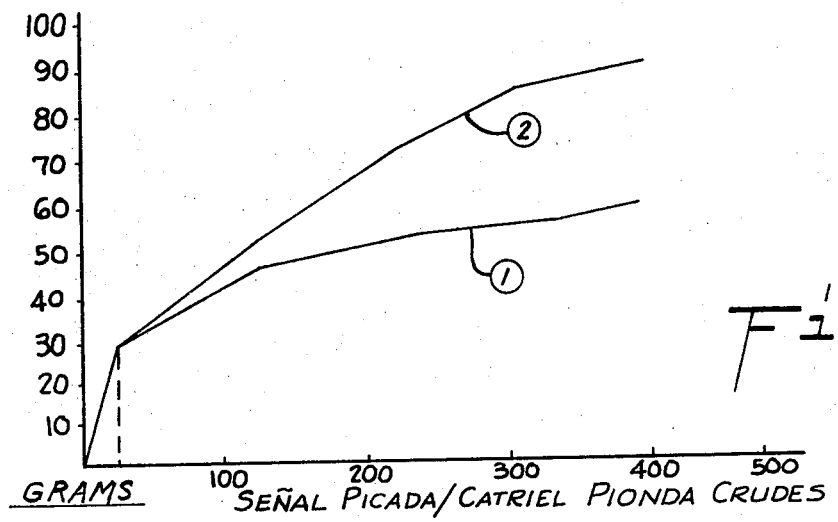
FIGS. 7, 8 and 9 are graphs of results of tests conducted using the apparatus of FIG. 1.

Referring now to the GS–9 (ethoxylated linear alcohol with sodium, lignosulfonate, and sugar — concentration 0.1 percent), and water flood run, Runs No. 2 and No. 1, respectively, FIG. 9, it may be seen clearly, as charted, that the detergent protected the sacrificial material to give higher yield with an oil bank being formed, even with relatively thin oil. The viscosity of the Señal Picada (93 CS), and of the Catriel Oeste (180CS) averaging, in the proportions (2:1) used, approximately 122 CS, such Argentine oils being more paraffinic in nature than most Texas crudes.

This invention is not limited to detail, with the structures, apparatus, method steps and procedures, also charts, graphs and visual indicia being by way of demonstration of the spirit thereof, whereas the appended claims are exemplary.

We claim:

1. The method of secondary recovery of relatively viscous oil and to reduce "fingering"; comprising the steps of, injecting into a well an unstable emulsifier to form an invert emulsion forming an oil bank and a stable emulsifier to clean the formation, and following with water flood to transfer the emulsified to, and up, a producing well.

2. The method of secondary recovery as claimed in claim 1 in which the water flood is by a "slug" of viscous water followed by water.

3. The method of secondary recovery as claimed in claim 2 in which the viscous water is followed by fresh water.

4. The method of secondary recovery as claimed in claim 2 in which the viscous water is followed by salt water.

5. The method of secondary recovery as claimed in claim 2 in which sacrificial material is included with an emulsifier.

6. The method of secondary recovery as claimed in claim 1, in which the water flood is with fresh water.

7. The method of secondary recovery as claimed in claim 1 in which the water flood is with salt water.

8. The method of secondary recovery as claimed in claim 1, in which sacrificial material is included with an emulsifier.

9. The method of injecting, as a chemical sweep, into an oil producing formation as sacrificial materials, chemical compounds including at least one of cationic, anionic, or non-ionic groups adapted to give water solubility to molecules and capable of competing with detergent hydrophilic groups for anchor sites in the oil producing formation, injecting into the formation at, at least one of points along with the sacrificial material and following thereafter, a least one of hydrophilic-hydrophobic detergent molecules and invert emulsion activator materials in form of at least one of water soluble inorganic and organic molecules which hydrolize in water to form strong bases, whereby the molecules deprived of anchor sites are free to form invert emulsions with oil in the formation.

10. The method as claimed in claim 9 in which hydrophilic-hydrophobic detergent molecules and emulsification activator molecules are injected.

11. The method as claimed in claim 9 in which the emulsification activator is selected from the group of activators consisting of hydroxide, oxide, borate, silicate and phosphate ions in combination with at least one of alkali metal ions and ammonium ions.

12. The method as claimed in claim 9 in which the emulsification activator molecules are from the group of organic bases consisting of amines, pyridines, ethanolamines, their polymers, their salts, and their esters.

13. The method as claimed in claim 9 which additionally includes injecting, along with the sacrificial material, surface active agents capable of forming spontaneous emulsification of the oil for the purpose of loading the aqueous phase of the emulsion.

14. The method as claimed in claim 9 in which the emulsification activator comprises sodium hydroxide, and in which borax in concentration of from 50 to 100 percent of the sodium hydroxide in presence of at least 25,000 parts per million sodium chloride, will inhibit the swelling of montmorillonite clays.

15. The method as claimed in claim 9 in which at least one of the hydrophilic-hydrophobic detergent molecules and the emulsification activator materials are selected on basis of their hydrophilic-lyophilic balance and surface tension properties.

16. The method as claimed in claim 9 in which at least one of the hydrophilic-hydrophobic detergent molecules and the emulsification activator materials are used in combination with surface active agents capable of forming spontaneous emulsification of the oil-water phases, and after beginning of injection the rate of injection being controlled to effect at least one of slowing down and stopping the advance of the emulsion front, whereby the oil may migrate to form an oil bank to allow a maximal oil recovery with the minimal chemical expenditure and mechanical assistance.

17. The method claimed in claim 9 in which the emulsion activator material activates the surface active materials in the oil, whereby the concentration of the emulsification activator alters the particle size of the emulsion within the limits of the oil mixture, the higher the concentration, the smaller the particle size.

18. The method as claimed in claim 9, in which penetrating agents capable of counteracting the forces binding the oil to the formation are utilized to remove oil for emulsification purposes.

19. The method as claimed in claim 9, in which a thickened displacing fluid is included following the emulsion flood to thicken the water and to allow a more uniform recovery of the oil.

20. The method as claimed in claim 9, which additionally includes following the emulsion flood with at least one of fresh and salt water to move the produced emulsion to a producing well for recovery.

21. The method as claimed in claim 9, in which the concentration of the sacrificial material is limited in a manner that it will be used up in the process, whereby the detergent will then be depleted.

22. The method as claimed in claim 9, in which a solubilizing agent is added to aid in emulsification.

23. Additional process following chemical sweep as claimed in claim 9, and in environment comprising at least two zones of different permeabilities, which comprises flooding of the swept zone with an aqueous solution containing salts of a multi-valent material capable of forming an invert emulsion with the emulsified oil, whereby the said aqueous solution then statically remains in more permeable zone, and thereafter conducting less permeable zone sweep whereby any emulsified oil migrating from lower permeable zone to higher permeable zone will react with the salts of the multi-valent material to form invert emulsions which create excluding barrier to prevent further migration and to permit a clean sweep of the less permeable zone.

24. The method as claimed in claim 23, in which both hydrophilic-hydrophobic detergent molecules and emulsification activator molecules are injected.

25. The method as claimed in claim 23 in which the emulsification activator is selected from the group of activators consisting of hydroxide, oxide, borate silicate and phosphate ions in combination with at least one of alkali metal ions and ammonium ions.

26. The method as claimed in claim 23 in which the emulsification activator molecules are from the group of organic bases consisting of amines, pyridines, ethanonlamines, their polymers, their salts, and their esters.

27. The method as claimed in claim 23 which additionally includes injecting, along with the sacrificial material surface active agents capable of forming spontaneous emulsification of the oil for the purpose of loading the aqueous phase of the emulsion.

28. The method as claimed in claim 23 in which at least one of the hydrophilic-hydrophobic detergent molecules and the emulsification activator materials are selected on basis of their hydrophilic-lyonphilic balance and surface tension properties.

29. The method as claimed in claim 23 in which at least one of the surface tension and hydrophilic-lyophilic balance of the detergent molecules and of the emulsification activator materials are selected to form an unstable emulsion capable of emulsifying and then de-emulsifying the oil to form oil banks, thus eliminating "fingering."

30. The method as claimed in claim 23 in which at least one of the hydrophilic-hydrophobic detergent molecules and the emusification activator materials are used in combination with surface active agents capable of forming spontaneous emulsification of the oil, after beginning of injection the rate of injection being controlled to effect at least one of slowing down and stopping the advance of the emulsion front, whereby the oil may migrate to form an oil bank to allow a maximal oil recovery with a minimal chemical expenditure and mechanical assistance.

31. The method as claimed in claim 23, in which the emulsion activator material activates the surface active materials in the oil, whereby the concentration of the emulsification activator alters the particle size of the emulsion within the limits of the oil mixture, the higher the concentration, the smaller the particle size.

32. The method as claimed in claim 23, in which penetrating agents capable of counteracting the forces binding the oil to the formation are utilized to remove oil for emulsification purposes.

33. The method as claimed in claim 23, which additionally includes following the emulsion flood with at least one of fresh and salt water to move the produced emulsion to a producing well for recovery.

34. The method as claimed in claim 23, in which the concentration of the sacrificial material is limited in manner that they will be used up in process, whereby the detergent will then be depleted.

35. The method as claimed in claim 23, in which a solubilizing agent is added to aid in emulsification.

36. The method as claimed in claim 9 in which a salt of a multi-valent material capable of forming an invert emulsion with the emulsified oil is introduced into the water zone of an oil bearing formation to react with the emulsified oil to form an excluding barrier to prevent "coning" in the well.

37. The method as claimed in claim 9 in which a salt of a multi-valent material capable of forming an invert emulsion with the emulsified oil is introduced into a fracture at the oil-water contact zone in manner that it reacts with emulsified oil to form an exclusion barrier to prevent coning.

38. The method as claimed in claim 9 in which a salt of a multi-valent material capable of forming an invert emulsion with the emulsified oil is introduced into a fault zone in manner to react with the emulsified oil to form an exclusion barrier to contain an emulsion flood.

39. The method of injecting, as a chemical sweep, into an oil producing formation as sacrificial materials, chemical compounds including at least one of cationic, anionic, or non-ionic groups adapted to give water solubility to molecules and capable of competing with detergent hydrophilic groups for anchor sites in the oil producing formation, injecting into the formation at, at least one of points along with the sacrificial material and following thereafter, at least one of hydrophilic-hydrophobic detergent molecules and invert emulsion activator materials in form of at least one of water soluble inorganic and organic molecules which hydrolize in water to form strong bases, whereby the molecules deprived of anchor sites are free to form invert emulsions with oil in the formation in which material capable of tying up aluminate ions is incorporated in the formulation to prevent the formation of invert emulsions.

40. The method of injecting, as a chemical sweep, into an oil producing formation as sacrificial materials, chemical compounds including at least one of cationic, anionic, or non-ionic groups adapted to give water solubility to molecules and capable of competing with detergent hydrophilic groups for anchor sites in the oil producing formation, injecting into the formation at, at least one of points along with the sacrificial material and following thereafter, at least one of hydrophilic-hydrophobic detergent molecules and invert emulsion activator materials in form of at least one of water soluble inorganic and organic molecules which hydrolize in water to form strong bases, whereby the molecules deprived of anchor sites are free to form invert emulsions with oil in the formation in which at least one of the surface tension and hydrophilic-lyophilic balance of the detergent molecules, and of the emulsification activator materials are selected to form an unstable emulsion capable of emulsifying and then de-emulsifying the oil to form oil banks, thus eliminating "fingering."

41. The method of injecting as a chemical sweep into an oil producing formation, for the purpose of loading the aqueous phase of the inverse emulsion to be formed, surface active agents capable of forming spontaneous inverse emulsification of the oil, and at substantially the same time injecting hydrophilic-hydrophobic detergent molecules and emulsification activator materials in form of at least one of water soluble inorganic and organic molecules which hydrolize in water to form strong bases, whereby transient changes in surface tension between aqueous and oil phase result in spontaneous inverse emulsification of the oil as aforesaid.

42. The method as claimed in claim 41, in which at least one of the hydrophilic-hydrophobic detergent molecules and the emulsification activator materials are selected on basis of their hydrophobic-lyophilic balance and surface tension properties.

43. The method as claimed in claim 41, in which at least one of the hydrophilic-hydrophobic detergent molecules and the emulsification activator materials are used in combination with surface active agents capable of forming spontaneous emulsification of the oil, after beginning of injection the rate of injection being controlled to effect at least one of slowing down and stopping the advance of the emulsion front, whereby the oil may migrate to form an oil bank to allow a maximal oil recovery with a minimal chemical expenditure and mechanical assistance.

44. The method as claimed in claim 41, in which penetrating agents capable of counteracting the forces binding the oil to the formation are utilized to remove oil for emulsification purposes.

45. The method as claimed in claim 41, in which a solubilizing agent is added to aid in emulsification.

46. The method as claimed in claim 41 in which the emulsification activator comprises sodium hydroxide, and in which borax in concentration of from 50 to 100 percent of the sodium hydroxide in presence of at least 25,000 parts per million sodium chloride, will inhibit the swelling of montmorillonite clays.

47. The method of injecting as a chemical seep into an oil producing formation, for the purpose of loading the aqueous phase of the emulsion to be formed, surface active agents capable of forming spontaneous emulsification of the oil, and at substantially the same time injecting hydrophilic-hydrophobic detergent molecules and emulsification activator materials in form of at least one of water soluble inorganic and organic molecules which hydrolize in water to form strong bases, whereby transient changes in surface tension between aqueous and oil phase result in spontaneous emulsification of the oil as aforesaid, in which at least one of the surface tension and hydrophilic-lyophilic balance of the detergent molecules and of the emulsification activator materials are selected to form an unstable emulsion capable of emulsifying and then de-emulsifying the oil to form oil banks, thus eliminating "fingering."

48. The method of injecting as a chemical sweep into an oil producing formation, for the purpose of loading the aqueous phase of the emulsion to be formed, surface active agents capable of forming spontaneous emulsification of the oil, and at substantially the same time injecting hydrophilic-hydrophobic detergent molecules and emulsification activator materials in form of at least one of water soluble inorganic and organic molecules which hydrolize in water to form strong bases, whereby transient changes in surface tension between aqueous and oil phase result in spontaneous emulsification of the oil as aforesaid, in which the emulsion activator material activates the surface active materials in the oil, whereby the concentration of the emulsification activator alters the particle size of the emulsion within the limits of the oil mixture, the higher the concentration, the smaller the particle size.

49. The method of injecting as a chemical sweep into an oil producing formation, for the purpose of loading the aqueous phase of the emulsion to be formed, surface active agents capable of forming spontaneous emulsification of the oil, and at substantially the same time injecting hydrophilic-hydrophobic detergent molecules and emulsification activator materials in form of at least one of water soluble inorganic and organic molecules which hydrolize in water to form strong bases, whereby transient changes in surface tension between aqueous and oil phase result in spontaneous emulsification of the oil as aforesaid, in which material capable of tying up aluminate ions is incorporated in the formulation of invert emulsification.

50. The method of injecting, as a chemical sweep, into an oil producing formation as sacrificial materials, chemical compounds including at least one of cationic, anionic, or non-ionic groups adapted to give water solubility to molecules and capable of competing with detergent hydrophilic groups for anchor sites in the oil producing formation, injecting into the formation at, at least one of points along with the sacrificial material and following thereafter, at least one of hydrophilic-hydrophobic detergent molecules and invert emulsion activator materials in form of at least one of water soluble inorganic and organic molecules which hydrolize in water to form strong bases, whereby the molecules deprived of anchor sites are free to form invert emulsions with oil in the formation, additional process following chemical sweep as claimed above, and in environment comprising at least two zones of different permeabilities, which comprises flooding of the swept zone with an aqueous solution containing salts of a multi-valent material capable of forming an invert emulsion with the emulsified oil, whereby the said aqueous solution then statically remains in more permeable zone, and thereafter conducting less permeable zone sweep whereby any emulsified oil migrating from lower permeable zone to higher permeable zone will react with the salts of the multi-valent material to form invert emulsions which create excluding barrier to prevent further migration and to permit a clean sweep of the less permeable zone, in which a thickened displacing fluid is included following the emulsion flood to thicken the water and to allow a more uniform recovery of the oil.

51. The method of injecting as a chemical sweep into an oil producing formation, for the purpose of loading the aqueous phase of the emulsion to be formed, surface active agents capable of forming spontaneous emulsification of the oil, and at substantially the same time injecting hydrophilic-hydrophobic detergent molecules and emulsification activator materials in form of at least one of water soluble inorganic and organic molecules which hydrolize in water to form strong bases, whereby transient changes in surface tension between aqueous and oil phase result in spontaneous emulsification of the oil as aforesaid, and in environment comprising at least two zones of different permeabilities, which comprises flooding of the swept zone with an aqueous solution containing salts of a multi-valent material capable of forming an invert emulsion with the emulsified oil, whereby the said aqueous solution then statically remains in more permeable zone, and thereafter conducting less permeable zone sweep whereby any emulsified oil migrating from lower permeable zone to higher permeable zone will react with the salts of the multi-valent material to form invert emulsions which create excluding barrier to prevent further migration and to permit a clean sweep of the less permeable zone.

52. The method as claimed in claim 51 in which at least one of the hydrophilic, hydrophobic detergent molecules and the emulsification activator materials are selected on basis of their hydrophobic-lyophilic balance and surface tension properties.

53. The method as claimed in claim 51, in which at least one of the surface tension and hydrophilic-lyophilic balance of the detergent molecules and of the emulsification activator materials are selected to form an unstable emulsion capable of emulsifying and then de-emulsifying the oil to form oil banks, thus eliminating "fingering."

54. The method as claimed in claim 51, in which at least one of the hydrophilic-hydrophobic detergent molecules and the emulsification activator materials are used in combination with surface active agents capable of forming spontaneous emulsification of the oil, after beginning of injection the rate of injection being controlled to effect at least one of slowing down and stopping the advance of the emulsion front, whereby the oil may migrate to form an oil bank to allow a maximal oil recovery with a minimal chemical expenditure and mechanical assistance.

55. The method as claimed in claim 51, in which the emulsion activator material activates the surface active materials in the oil, whereby the concentration of the emulsification activator alters the particle size of the emulsion within the limits of the oil mixture, the higher the concentration, the smaller the particle size.

56. The method as claimed in claim 51 in which penetrating agents capable of counteracting the forces binding the oil to the formation are utilized to remove oil for emulsification purposes.

57. The method as claimed in claim 51, in which a solubilizing agent is added to aid in emulsification.

58. The method as claimed in claim 51 in which material capable of tying up aluminate ions is incorporated in the formulation of invert emulsification.

59. The method as claimed in claim 51 in which the emulsification activator comprises sodium hydroxide, and in which borax in concentration of from 50 to 100 percent of the sodium hydroxide in presence of at least 25,000 parts per million sodium chloride, will inhibit the swelling of montmorillonite clays.

60. The method of injecting as a chemical sweep into an oil producing formation, for the purpose of loading the aqueous phase of the emulsion to be formed, surface active agents capable of forming spontaneous emulsification of the oil, and at substantially the same time injecting hydrophilic-hydrophobic detergent molecules and emulsification activator materials in form of at least one of water soluble inorganic and organic molecules which hydrolize in water to form strong bases, whereby transient changes in surface tension between aqueous and oil phase result in spontaneous emulsification of the oil as aforesaid, in which a salt of a multi-valent material capable of forming an invert emulsion with the emulsified oil is introduced into the water zone of an oil bearing formation to react with the emulsified oil to form an excluding barrier to prevent "coning" in the well.

61. The method of injecting as a chemical sweep into an oil producing formation, for the purpose of loading the aqueous phase of the emulsion to be formed, surface active agents capable of forming spontaneous emulsification of the oil, and at substantially the same time injecting hydrophilic-hydrophobic detergent molecules and emulsification activator materials in form of at least one of water soluble inorganic and organic molecules which hydrolize in water to form strong bases, whereby transient changes in surface tension between aqueous and oil phase result in spontaneous emulsification of the oil as aforesaid, in which a salt of a multi-valent material capable of forming an invert emulsion with the emulsified oil is introduced into a fracture at the oil-water contact zone in manner that it reacts with emulsified oil to form an exclusion barrier to prevent coning.

62. The method of injecting as a chemical sweep into an oil producing formation, for the purpose of loading the aqueous phase of the emulsion to be formed, surface active agents capable of forming spontaneous emulsification of the oil, and at substantially the same time injecting hydrophilic-hydrophobic detergent molecules and emulsification activator materials in form of at least one of water soluble inorganic and organic molecules which hydrolize in water to form strong bases, whereby transient changes in surface tension between aqueous and oil phase result in spontaneous emulsification of the oil as aforesaid, in which a salt of a multi-valent material capable of forming an invert emulsion with the emulsified oil is introduced into a fault zone in manner to react with the emulsified oil to form an exclusion barrier to contain an emulsion flood.

* * * * *